US007861923B2

(12) United States Patent
Davis et al.

(10) Patent No.: US 7,861,923 B2
(45) Date of Patent: *Jan. 4, 2011

(54) NEGOTIABLE INSTRUMENTS AND SYSTEMS AND PROCESSING SAME

(75) Inventors: Joan-Astrid Davis, Dallas, TX (US); Gladys A. Perez, Annadale, VA (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/338,922

(22) Filed: Dec. 18, 2008

(65) Prior Publication Data

US 2009/0121013 A1    May 14, 2009

Related U.S. Application Data

(63) Continuation of application No. 10/722,713, filed on Nov. 25, 2003, now Pat. No. 7,500,598.

(51) Int. Cl.
  *G06K 5/00* (2006.01)
(52) U.S. Cl. .......................... 235/379; 235/380; 705/42
(58) Field of Classification Search .................. 235/379, 235/380; 705/42
  See application file for complete search history.

(56) References Cited

U.S. PATENT DOCUMENTS

| | | | |
|---|---|---|---|
| 4,321,672 A | 3/1982 | Braun et al. |
| 5,093,787 A | 3/1992 | Simmons |
| 5,121,945 A | 6/1992 | Thomson et al. |
| 5,324,077 A | 6/1994 | Kessler et al. |
| 5,393,963 A | 2/1995 | Thomas et al. |
| 5,433,483 A | 7/1995 | Yu |
| 5,630,073 A | 5/1997 | Nolan |
| 5,740,271 A | 4/1998 | Kunkler et al. |
| D396,487 S | 7/1998 | Kunkler |
| D396,488 S | 7/1998 | Kunkler |
| 5,783,808 A | 7/1998 | Josephson |
| 5,798,508 A | 8/1998 | Walker et al. |
| 5,812,989 A | 9/1998 | Witt et al. |
| 5,857,079 A | 1/1999 | Claus et al. |
| 5,870,725 A | 2/1999 | Bellinger et al. |
| 5,882,041 A | 3/1999 | Schara |
| 5,917,931 A | 6/1999 | Kunkler |
| 5,930,778 A | 7/1999 | Geer |
| 6,006,204 A | 12/1999 | Malcolm |
| 6,126,203 A | 10/2000 | Dwork et al. |

(Continued)

*Primary Examiner*—Daniel A Hess
(74) *Attorney, Agent, or Firm*—Snell & Wilmer L.L.P.

(57) ABSTRACT

There is provided a check with additional data capture capability that in conjunction with a linked transaction card provides substantially complete coverage for card holders to conduct transactions with merchants for the payment of goods and services. The additional data capture capability enabling generation of a card statement with detailed information regarding purchases and expenditures of both check transactions and card transactions to thereby permit a card holder to accurately track, monitor, describe, and reconcile all transactions in a statement period. The check comprises first and second data entry location for identification and descriptive information about a financial transaction, account holder name adjacent to a drawer signature field and check limit adjacent to a written check amount field, as well as other check information and entry fields, including routing, account and check reference number, date, payee designation, numeric check amount and account holder and financial institution information.

18 Claims, 3 Drawing Sheets

Test Process Overview

U.S. PATENT DOCUMENTS

| | | |
|---|---|---|
| 6,128,602 A | 10/2000 | Northington et al. |
| 6,353,811 B1 | 3/2002 | Weissman |
| 2001/0037299 A1 | 11/2001 | Nichols et al. |
| 2001/0042785 A1 | 11/2001 | Walker et al. |
| 2002/0026416 A1 | 2/2002 | Provinse |
| 2002/0077978 A1 | 6/2002 | O'Leary et al. |
| 2002/0088849 A1 | 7/2002 | Nichols et al. |
| 2002/0147668 A1 | 10/2002 | Smith et al. |
| 2003/0033252 A1 | 2/2003 | Buttridge et al. |
| 2003/0074288 A1 | 4/2003 | Quine |
| 2003/0083967 A1 | 5/2003 | Fleming |
| 2003/0126011 A1 | 7/2003 | Bryman et al. |

Client Name — 113

Pay to the Order of _____ Date: _____ 121 / 127 / 125 / 112 / 104

$ _____

_____ Dollars — 119

American Express — 111
1-800-555-5555
Payable through Bank — 135
Cost Center
For _____ — 130 — NOT VALID OVER $500.00
JOHN SMITH — 115

⑈ 000000  000000000  00000  00104 — 117

105 — 107 — 109

110

Client Name

American Express
1-800-555-5555
Payable through Bank

For added security, the
account number no longer
appears on this copy

TAX DEDUCTIBLE ITEM ☐ — 104

THIS PAYMENT _____
BALANCE
OTHER
BAL. FOR'D _____

BAL. FOR'D

00104    NOT NEGOTIABLE

NEGOTIABLE INSTRUMENTS AND SYSTEMS AND PROCESSING SAME

CROSS-REFERENCE TO RELATED APPLICATIONS

This application is a continuation of application Ser. No. 10/722,713, filed Nov. 25, 2003, which is hereby incorporated by reference in its entirety, as if fully set forth herein.

TECHNICAL FIELD

The present subject matter relates generally to the field of negotiable financial instruments. More particularly, the subject matter relates to checks, and systems for processing checks, that can be used to generate an electronic or paper statement or a reconciliation file containing purchase transaction data that can be used for reconciliation purposes.

BACKGROUND

Payment for goods and service via transaction cards and other negotiable instruments, such checks, is well known. A customer can pay for goods and services using a transaction card where transaction cards are accepted by a merchant as a form of payment. When accepted by merchants, payment for goods and services by use of a transaction card is often preferred since it is an easy, convenient and safe payment method and substantially reduces the need to carry cash or other more cumbersome instruments.

Some transaction card issuers have systems in place where purchase transaction data can be provided by a customer or card holder at the time of purchase. The purchase transaction data can be sent, via a payment system, to the card issuer and can ultimately be provided to a customer as part of a statement or a reconciliation file. The purchase transaction data can be identification information or descriptive information such as a customer's cost center, cost code, project number or other similar information or a brief description of the goods or service purchased.

Card issuers typically issue periodic statements to card holders that detail and itemize all transactions made using the card holder's card account during the period. The information included in the card statements is very useful to the card holder and can include the amount, date, location, category of each transaction, as well as the purchase transaction data.

The card holder's statements can be provided as traditional paper statements and/or as electronic files, e.g., over the internet. For ease of use in reconciling a card holder's records and accounts a reconciliation file may also be provided. When provided as electronic files, the data from the statement or reconciliation file may be uploaded to commonly used or proprietary accounts payable, general ledger, procurement and capital goods tracking systems. Such systems are offered by companies such as SAP, Bann, PeopleSoft, Great Lakes, Oracle, Walker and J.D. Edwards. The statements and reconciliation files, especially those that provide purchase transaction data, enable the card holder to track and monitor expenditures, to reconcile expenditures against the card holder's own records, or to use the card statement to fill in missing entries and information in the card holder's records. These record keeping advantages can be especially important in a business environment where detailed and accurate record-keeping is critical to the success of the business enterprise and where recordkeeping may be mandated by governmental regulations. Transaction cards thus provide an excellent vehicle for both business and individual card holders to monitor and reconcile expenditures.

A drawback of using transaction cards, however, is that transaction cards are not universally accepted by all merchants. Thus, a card holder's ability to pay for goods and services using a transaction card, though substantial, is less than one hundred percent (100%). In these instances, card holders must pay for the goods and services with another form of payment, such as cash or another financial instrument. Other financial instruments may include money orders, traveler's checks, cashier's checks, bank checks. These other instruments can be inconvenient, impractical and/or unsafe. Further, most of these forms of payment do not provide any type of statement. Those that do provide statements, do not provide purchase transaction data that is gathered and provided in the statement for use by a customer to reconcile an account.

In addition, use of the other forms of payment that provide statements, such as checks, cause transaction card users to receive two separate statements, the first statement being from the transaction card issuer for the transaction card transactions and the second statement being from a bank for the check transactions. To provide customers with convenience, some transaction card companies issue "convenience checks" to card holders that can be used by card holders to pay for goods and services, especially with merchants that do not accept the transaction card for payment. The convenience checks are similar to typical checks, but are linked to the same account as the transaction card, so the customer receives only one periodic statement for both types of transactions. However, as described above, the information provided about the check purchases on the statement lacks purchase transaction data which has heretofore been provided for certain transaction card transactions.

SUMMARY

There is provided a check with one or more designated locations in which a customer can provide purchase transaction data that can be captured in a check clearing process and can be provided to a customer in a statement or a reconciliation file for reconciliation purposes. The check may be associated with or linked to a transaction card account which also captures similar purchase transaction data. Further, the transaction card account may be associated with or linked to a master corporate purchasing account. The purchase transaction data capture capability and the association with a transaction card account enable the generation of a single periodic statement to a customer that contains detailed information regarding purchases and expenditures of both check transactions and card transactions and permits a customer to more easily track, monitor and reconcile its financial transactions.

The check can be linked to a transaction card account for a charge card, credit card, debit card, smart card, digital card, bank card, smart card, access card or electronic commerce card. The check further has at least one area where purchase transaction data can be provided so that it is captured through the check clearinghouse process. The purchase data can be identification information or descriptive information. Identification information may include cost center, cost code, project override or any other information desired by the customer. Descriptive information may include a brief description of the goods or service purchased. Of course any other purchase transaction information a customer desires can be provided.

A system and method for processing a check and gathering purchase transaction data is also provided. The method includes the steps of receiving an electronic or computer file containing purchase transaction data obtained from the check, mapping the purchase transaction data into a field on a second computer file and generating a statement or reconciliation file which includes the purchase transaction data from the second computer file.

Additional objects, advantages and features of the examples will be set forth in part in the description which follows, and in part will become apparent to those of ordinary skill in the art upon examination of the following and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements. The description may be better understood when read in connection with the accompanying drawings, of which:

FIG. 1 illustrates an embodiment of a check; and

DETAILED DESCRIPTION

Figure 2:
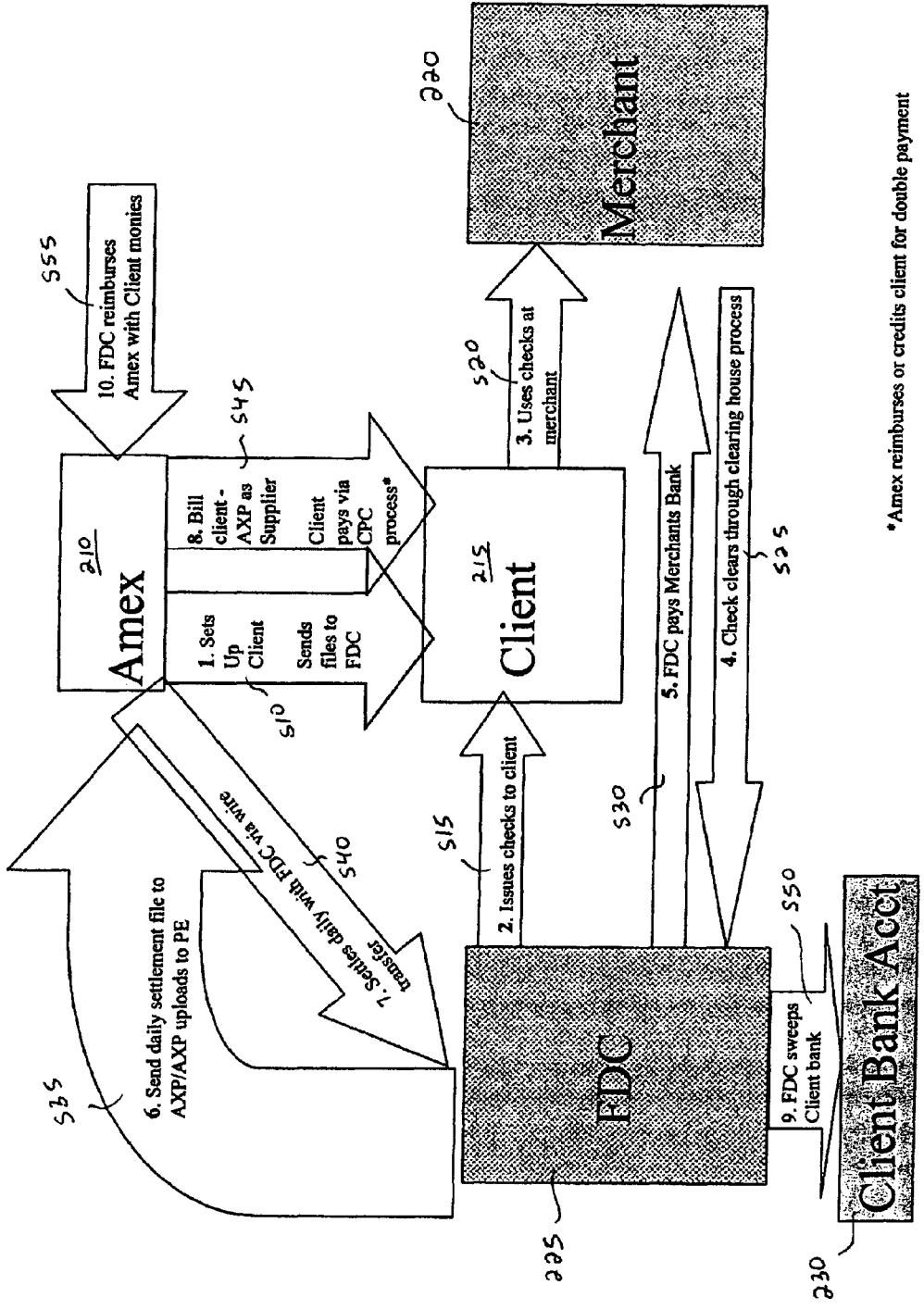
FIG. 2 illustrates a schematic diagram of a system used to process the check of FIG. 1.

FIG. 1 shows an example of a check 100 and an optional accompanying duplicate 110, such as a carbon copy or carbonless pressure copy, that may be provided. On the front face 103 of the check 100, there is provided pre-printed data and blank spaces to be completed by a customer. As shown, the pre-printed data includes bank and personalized information. As also shown, the bank information includes a bank transit/routing number 105, customers account number 107, and a check serial or reference number 109 in magnetic ink character recognition (MICR) form. The bank information also includes the name, address and phone number 111 of the check issuing institution or bank and a printed check number 112. The personalized information includes the account holder's or client name, address and phone number 113 and may also include other personalized information, such as, for example, a social security number, driver's license number or other client related data.

As shown, the check 100 also includes the check writer's or customer's printed name 115 preferably positioned above or adjacent a signature line 117 such that the printed name 115 serves as a prompt to the merchant or person receiving the check 100 to verify the identification of the check writer, but still leaves sufficient space for the check writer's signature on the signature line 117. Further, as shown, the check 100 includes a printed check limit amount 119 indicating that the check 100 is only valid up to a specified imprinted amount. The printed check limit amount 119 can be positioned below or adjacent to the written amount field 127 on the check 100. A check 100 that is written for an amount greater than the printed check limit would be invalid and returned as having non-sufficient funds.

Blank data locations or blank spaces are also provided for the entry of transaction specific data or information. These locations include standard check data, such as a date location 121, a numeric check amount location 125, a "pay to the order of" location 123, a written check amount location 127, and a drawer signature location 117. Moreover, as shown, the check 100 also has two locations for purchase transaction data, shown as blank lines 130 and 135.

The data provided by a customer in the blank locations 130 and 135 can be captured and recorded, during the check clearance process into a data file. For example, and as will be described below in more detail with respect to the example shown in FIG. 2, the data provided on lines 130 and 135 is gathered and recorded by the clearing house organization conducting the check clearing process. The additional data provided on lines 130 and 135 can then provided by the clearing house organization to a customer's bank, who then provides or includes the data provided in lines 130 and 135, along with other standard check data, to the consumer in a statement or a reconciliation file.

The check 100 may be a convenience check which is associated with or linked to a specific or corresponding transaction card account. Thus, a transaction conducted using the check 100 and processed in the check clearing process may be associated with or linked to a corresponding transaction card account. Accordingly, a data file containing all of the gathered and recorded standard check data and purchase transaction data can be transmitted to the card issuer and associated with the linked transaction card account. The card issuer may then issue a periodic statement that includes transaction specific and purchase transaction data from transactions made using the check 100 and from transactions made using a transaction card. Similarly, the card issuer may create and provide a separate reconciliation file that also includes transaction specific and purchase transaction data from the transactions made using the checks and an associated transaction card. The reconciliation file may be an electronic file with data similar to that in a statement, however, although the statement and reconciliation file may contain some of the same data, e.g., purchase transaction data and transaction specific data, the data in a statement and a reconciliation file may differ. The card holder or customer can then use the information on the combined statement or combined reconciliation file to conveniently and efficiently track, monitor and reconcile all personal and or business expenditures. Further, the card issuer can combine the transaction specific and purchase transaction data for all card holder's associated with a master purchasing account. In this manner, the card issuer can create a master reconciliation file for all transactions, i.e., those made by transaction cards and checks, for all card holders associated with the master account, which can be also be used for reconciliation purposes.

In one embodiment, the check 100 can have two blank purchase transaction data locations 130 and 135. For example, the first blank location 130 may be provided where the consumer enters "descriptive information" about a purchase transaction. The descriptive information can be text description that subsequently enables the customer to determine the nature of the purchase transaction that was paid with that check 100. The second blank location 135 may be provided where the customer can enter "identification information" about the purchase transaction. The identification information can be in the form of numeric or alphanumeric characters, or any other type of symbol, mark or code chosen by a customer, and corresponds or is mapped to a field on a statement that enables the customer to reconcile the transaction made with the check 100, e.g. to determine what company, division, group, project, team, etc., the transaction should be billed to. The information may also be a designation for a specific cost code, a cost center, a project code, an override code or other unique identifying information designated by a consumer or organization to assist in adequately tracking and reconciling expenditures using the check 100. Those of ordinary skill in the art will readily recognize that although the check 100 shown in FIG. 1 has two blank data locations 130 and 135, a single location may be sufficient, or more than two blank data locations may be used for additional purchase transaction information.

As shown, the blank data locations 130 and 135 have pre-printed indicators located adjacent or near each location to remind or prompt a customer about the type of purchase transaction information to be provided in the locations. For example, the indicator "For" is provided before the location 130 and the indicator "Cost Center" is provided before the location 135. Those of ordinary skill in the art will readily recognize that other indicators can be chosen. Further, during the check clearing process described below in more detail, only a limited number of characters may be gathered. For example, the first and second blank location or fields 130 and 135 may be limited to sixteen characters in length. If a person provided more than the permitted number of characters, only the first sixteen may be gathered. Of course, longer or shorter character lengths may also be chosen.

Generally, in a check clearance process the merchant, or any other person receiving a check as a payment, deposits the check 100 in the merchant's bank for payment of the funds to the merchant's account. The merchant's bank verifies the deposited check 100 with the check issuing bank before converting the check 100 to available cash for the merchant. The merchant's bank passes the check 100, along with a payment request, to an external entity, such as a clearing house or intermediary bank, for verification and settlement. The clearing house identifies the paying bank by reading or looking at the check's routing number 105 which identifies the bank that issued the check 100. The clearing house then presents the check issuing bank with the check 100, along with a payment request. If the check issuing bank agrees to pay, the check 100 has been verified. The clearing house then proceeds to settle the check 100, debiting the check issuing bank and crediting the merchant's bank account for the value of the check 100. The check issuing bank then debits the check issuing bank checking account. At the end of the clearing process, the merchant has full access to the cash value of the check 100 written by the consumer.

During the clearing process, the clearing house gathers information about the check 100 such as check number 112, check amount 125 and check date 121 and may also make a copy of the check 100. The clearing house will also gather or capture the purchase transaction data provided on the check 100. Thus, during the clearing process, the clearing house preferably captures and records the identification and descriptive information or data entered on the face 103 of the check 100 in the first and second blank locations 130 and 135, which in the embodiment of FIG. 1 are labeled as "For" and "Cost Center". Those of ordinary skill in the art will readily recognize that additional such blank locations could be used and that the blank locations can have different indicators. The information provided in location 130 will be mapped to and provided in a first predetermined field or location in a data file (see, e.g. FIG. 3) and may eventually be provided on a customer's statement or reconciliation file. Similarly, the information provided in location 135 will be mapped to and provided in a second predetermined location on the data file and may also be provided on the customer's statement or reconciliation file.

The check 100 information can be gathered and recorded in known ways. For example, the information can be manually read and entered into a computer for storage. The information may be electronically scanned and stored, electronically read through an optical character recognition (OCR) system or in other known methods. The gathered information can later be transmitted to an appropriate party for subsequent use. For example, the information can be sent as an electronic or computer file to the card issuer. The card issuer can then provide the received identification information and descriptive information to the client, in a reconciliation file and/or a statement. The card issuer can combine the transaction specific data and the purchase transaction data from the check transactions with transaction specific and purchase transaction data it has from card transactions to create a statement and or reconciliation file for the account. The customer can then use the statement or reconciliation file to reconcile these transactions in their internal system.

FIG. 2 illustrates schematically a system that can be used to provide and clear checks, such as the check 100 shown in FIG. 1, which contain purchase transaction data. In Step S10, a card issuer 210 executes an internal procedure or process to select or determine which card holders or clients 215 can be offered and issued checks 100. The card holder 215 may be selected on various internal criteria developed by the card issuer 210 to meet their particular guidelines and applications. For example, the criteria may include the card holder's account purchasing and payment history, credit history, account credit limit, type of transaction card, etc. Once the card issuer 210 has determined which clients are to receive checks 100, the card holder 215 transaction card account will be programmed or set up such that the card account and the checks will correspond or be linked. In this manner, financial transactions conducted using checks 100 will be reflected on the card holder's periodic transaction card statement.

Once the card holder 215 is set up on the card issuer's transaction card system, the card holder 215 is notified of the availability of checks 100 for use. Appropriate files, records and information are also sent to a third or external check issuing entity 225. In a preferred embodiment, the check issuing entity 225 also carries out the check clearing process. Those of skill in the art will readily recognize that the check issuing entity 225 can also be, in certain cases, the card issuer 210, and that the check clearing process can be conducted by a third party other than the check 100 issuer.

In Step S15, a third party financial institution 225, after receiving appropriate information and approval from the card issuer 210, generates and issues checks 100 to the selected card holder 215. In Step S20, a card holder 215 is then able use the checks 100 to pay for goods and services.

In Step S25, after accepting checks 100 from a card holder 215 as payment, the merchant 220 will clear the check 100 by depositing check 100 in the merchant's bank. The merchant's bank passes the check 100, along with a payment request, to the clearing house 225 for verification and settlement. Clearing house 225 personnel identify the check issuing and paying bank by reading the check's routing number 105. The clearing house 225 then verifies the check 100 for payment. The clearing houses 225 can verify that the check 100 is valid by verifying its files and records to confirm that the information appearing on the face 103 is valid and active and corresponds to a card holder 215 who has been selected and authorized to receive checks 100 by the card issuer 210. As part of this process, the clearing house 225 also gathers and records information about the check 100, including check number 112, check amount 125 and check date 121 and may also make a copy of the check 100. The clearing house 225 further captures the purchase transaction data entered on the face 103 of the check 100 in the first and second locations 130 and 135, which in the embodiment of FIG. 1 are labeled as "For" and "Cost Center". This information can later be shared with the card holder to assist in tracking and reconciliation of expenditures.

In Step S30, once the clearing house 225 has verified the check 100, the clearing house 225 proceeds to settle the check 100 by paying or crediting the merchant's bank account for the value of the check 100. In Step S35, the clearing house transmits a daily settlement file or report to the card issuer 210 containing all of the gathered information or data for all of the checks processed and the amount of funds that have been paid out to merchants 220 on the processed checks. The information is preferably sent electronically but can be sent in others known forms, e.g., in paper files. The card issuer 210 can then take the received check information and appropriately associate and record the received check 100 data with a corresponding or linked transaction card account for subsequent inclusion in a periodic card statement.

In Step S40, after having received the daily settlement file from the clearing house 225, the card issuer 210 settles with the clearing house 225 via a wire transfer of the funds due. In one aspect, the card issuer 210 settles with the clearing house 225 on a daily basis, however, statements and reconciliation files can be created and settlement can occur on varying time periods, e.g., daily, weekly, monthly, etc. In Step S45, the card issuer 210 bills the card holder 215. The card holder 215 is preferably billed on a periodic basis, e.g., monthly, in a card statement that includes transaction charges for both the transaction card and checks 100.

After receiving the card issuer's 210 billing statement, the card holder 215 can pay the outstanding statement via a check, ACH, eft, wire, etc., and sent to the card issuer 210. If payment is by check, the card issuer 210 can then clear the card holder's check via a standard check clearing process by presenting the card holder's check to the clearing house 225 for payment.

The clearing house 225 identifies the card holder's paying bank by reading the check's routing number. The clearing house 225 then presents the card holder's bank with the check along with a payment request. If the card holder's bank agrees to pay, the card holder's check has been verified. In Step S50, the clearing house sweeps the card holder's checking account. In Step S55, the clearing house 225 settles the card holder's check and credits or reimburses the card issuer 210 with the value of the check.

Figure 3:
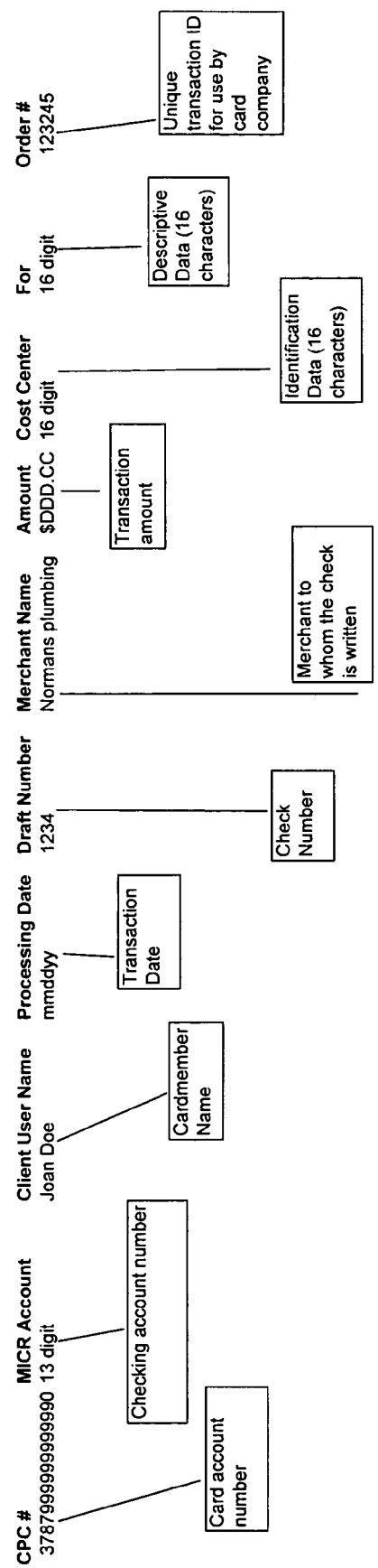
FIG. 3 illustrates a sample file layout of a file created by a clearinghouse and sent to a card issuer.

A specific example of the type of data that can be gathered into a data file by a clearing house 225 and sent to a card issuer 210 is shown in FIG. 3. As shown, the data file includes the following fields: "CPC#" which relates to a master corporate or purchasing account number having one or more card holder's accounts associated therewith, "MICR Account" which relates to the checking account number and is associated with a specific card holder account, "Client User Name" which is the card holder's name, "Processing Date" which is the date the transaction was made, "Draft Number" which is the check number, "Merchant Name" which is the merchant to whom the check was written, "Amount" which is the amount of the transaction, "Cost Center" which is a form of identification data (taken from data location 135), "For" which is a form of description data (taken from data location 130) and "Order #" which is a unique transaction identification number generated by the clearinghouse 225 for use by the card issuer 210 to identify this transaction. This data file, and the data fields therein, can then be sent electronically to and used by the card issuer 210 which can combine the file and data with other card issuer data, such as hard-coded data about the card holder and hard-coded data about the merchant involved in the transaction, to generate a statement and/or a reconciliation file for the card holder. As described above, the statement may be a paper or electronic statement an the reconciliation file may be an electronic file. The reconciliation file may also be a master reconciliation file for a master account as described above. The statement and/or reconciliation file each may contain selected of the data fields which can then be used with the card holder's accounts payable, general ledger, procurement and capital goods tracking system to reconcile the transactions therein. While an example of a data file is shown in FIG. 3 having specific data fields, other data fields may be used in the data file and the data fields may be changed, based upon a card issuer and/or the card member's needs.

Many of the control functions discussed above relating to the system 200 are implemented on computers, which of course may be connected for data communication via components of a network. The hardware of such computer platforms typically is general purpose in nature, albeit with an appropriate network connection for communication via the intranet, the Internet and/or other data networks.

As known in the data processing and communications arts, each such general-purpose computer typically comprises a central processor, an internal communication bus, various types of memory (RAM, ROM, EEPROM, cache memory, etc.), disk drives or other code and data storage systems, and one or more network interface cards or ports for communication purposes. The system 200 also may be coupled to a display and one or more user input devices (not shown) such as alphanumeric and other keys of a keyboard, a mouse, a trackball, etc. The display and user input element(s) together form a service-related user interface, for interactive control of the operation of the system 200. These user interface elements may be locally coupled to the system 200, for example in a workstation configuration, or the user interface elements may be remote from the computer and communicate therewith via a network. The elements of such a general-purpose computer also may be combined with or built into routing elements or nodes of the network.

The software functionalities involve programming, including executable code as well as associated stored data. The software code is executable by the general-purpose computer that functions as the particular computer. In operation, the executable program code and possibly the associated data are stored within the general-purpose computer platform. At other times, however, the software may be stored at other locations and/or transported for loading into the appropriate general-purpose computer system. Hence, the embodiments involve one or more software products in the form of one or more modules of code carried by at least one machine-readable. Execution of such code by a processor of the computer platform enables the platform to implement the functions described above, in essentially the manner performed in the embodiments discussed and illustrated herein.

As used herein, terms such as computer or machine "readable medium" refer to any medium that participates in providing instructions to a processor for execution. Such a medium may take many forms, including but not limited to, non-volatile media, volatile media, and transmission media. Non-volatile media include, for example, optical or magnetic disks, such as any of the storage devices in any computer(s) operating as one of the server platforms. Volatile media include dynamic memory, such as main memory of such a computer platform. Physical transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include, for example: a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Certain preferred examples have been described and illustrated by way of example only. Those skilled in that art will recognize that the preferred examples may be altered or amended without departing from the inventive spirit and scope of the subject matter. Therefore, the subject matter is not limited to the specific details, representative devices, and illustrated examples in this description. The novel subject matter is limited only by the following claims and equivalents.

We claim:

1. A method, comprising:
receiving, by a computer-based system for processing checks, a check issued by a check issuing entity and linked to a transaction account issued by a transaction account issuer, wherein the transaction account issuer and the check issuing entity are distinct, and wherein the check has purchase transaction data provided thereon, wherein the purchase transaction data includes at least one of a cost center, a cost code, a project code, an override code, and a description of a purchase;
reading, by the computer-based system, the purchase transaction data from the check ;
verifying, by the computer-based system, that the transaction account is authorized by the transaction account issuer to receive checks, wherein the transaction account is associated with the transaction account issuer; and
transmitting, by the computer-based system, the purchase transaction data to the transaction account issuer.

2. The method of claim 1, further comprising:
associating, by the computer-based system, the purchase transaction data to the transaction account; and
entering, by the computer-based system, the purchase transaction data into a predetermined field of an electronic file used to generate a statement.

3. The method of claim 2, wherein the purchase transaction data provided on the check comprises at least one alphanumeric character.

4. The method of claim 3, wherein the data entered in the electronic file is no more than 16 characters.

5. The method of claim 1, further comprising:
associating, by the computer-based system, the purchase transaction data to the transaction account; and
entering, by the computer-based system, the purchase transaction data into a predetermined field of an electronic file used to generate a reconciliation file.

6. The method of claim 1, wherein the transaction account is a credit card account.

7. A non-transitory computer-readable medium having stored thereon sequences of instructions, the sequences of instructions including instructions which when executed by a computer-based system for processing checks, causes the computer-based system to perform operations comprising:
receiving, by the computer-based system, a check issued by a check issuing entity and linked to a transaction account issued by a transaction account issuer, wherein the transaction account issuer and the check issuing entity are distinct, and wherein the check has purchase transaction data provided thereon, wherein the purchase transaction data includes at least one of a cost center, a cost code, a project code, an override code, and a description of a purchase;
reading, by the computer-based system, the purchase transaction data from the check;
verifying, by the computer-based system, that the transaction account is authorized by the transaction account issuer to receive checks, wherein the transaction account is associated with the transaction account issuer; and
transmitting, by the computer-based system, the purchase transaction data to the transaction account issuer.

8. The computer-readable medium of claim 7, which when executed by a computer system further causes the computer system to perform:
associating the purchase transaction data to the transaction account; and
entering the purchase transaction data into a predetermined field of an electronic file used to generate a statement.

9. The computer-readable medium of claim 8, wherein the purchase transaction data provided on the check comprises at least one alphanumeric character.

10. The computer-readable medium of claim 9, wherein the data entered in the electronic file is no more than 16 characters.

11. The computer-readable medium of claim 7, which when executed by a computer system further causes the computer system to perform:
associating the purchase transaction data to the transaction account; and
entering the purchase transaction data into a predetermined field of an electronic file used to generate a reconciliation file.

12. The computer-readable medium of claim 7, wherein the transaction account is a credit card account.

13. A check, comprising:
pre-printed account holder and financial institution information; and
a predetermined location for entry of purchase transaction data, wherein the purchase transaction data includes at least one of a cost center, a cost code, a project code, an override code, and a description of a purchase;
wherein the check is issued by a check issuing entity and associated with a transaction account issued by a transaction account issuer, wherein the transaction account issuer and the check issuing entity are distinct;
wherein the check issuing entity verifies that the transaction account is authorized to receive checks by the transaction account issuer;
wherein the purchase transaction data is communicated to the transaction account issuer through the check issuing entity.

14. The check of claim 13, wherein the purchase transaction data includes descriptive information or identification information.

15. The check of claim 14, wherein the check the descriptive information is selected from the group consisting of cost code information and cost center information.

16. The check of claim 13, wherein the transaction account is a credit card account.

17. A method for processing a check comprising:
linking, by a computer-based system at a check issuing entity having a processor and a memory for processing the check, a plurality of checks issued by the check issuing entity to a transaction card account issued by a transaction account issuer, wherein the transaction account issuer and the check issuing entity are distinct;

receiving, by the computer-based system, a check issued by the check issuing entity and linked to the transaction card account, said check having purchase transaction data provided thereon, wherein the purchase transaction data includes at least one of a cost center, a cost code, a project code, an override code, and a description of a purchase;

verifying, by the computer-based system, that the transaction card account is authorized by the transaction account issuer to receive checks;

entering, by the computer-based system, the purchase transaction data into a predetermined data field in an electronic file comprising other purchase transaction data;

communicating, by the computer-based system, the electronic file to the transaction account issuer; and associating, by the computer-based system, the purchase transaction data to the transaction card account linked to the plurality of checks.

18. A method of generating a statement containing information about a payment made with a check associated with a checking account, comprising:

linking, by a computer-based system at a check issuing entity having a processor and a memory for generating the statement, a plurality of checks issued by a check issuing entity to a transaction card account issued by a transaction account issuer, wherein the transaction account issuer and the check issuing entity are distinct;

receiving, by the computer-based system, a first electronic file containing purchase transaction data obtained from a check issued by the check issuing entity and linked to the transaction card account, wherein the purchase transaction data includes at least one of a cost center, a cost code, a project code, an override code, and a description of a purchase;

verifying, by the computer-based system, that the transaction card account is authorized by the transaction account issuer to receive checks;

mapping, by the computer-based system, the purchase transaction data into a predetermined field in a second electronic file;

generating, by the computer-based system, a third electronic file including said purchase transaction data from said second electronic file;

communicating, by the computer-based system, at least one of the second electronic file and the third electronic file to the transaction account issuer; and associating, by the computer-based system, said purchase transaction data to the transaction card account linked to the plurality of checks.

* * * * *